Nov. 26, 1935. S. MARGHITAN 2,022,356
MULTIPLE NUT CRACKING MACHINE
Filed May 14, 1934 3 Sheets-Sheet 1

Inventor
Sam Marghitan

Nov. 26, 1935.    S. MARGHITAN    2,022,356
MULTIPLE NUT CRACKING MACHINE
Filed May 14, 1934    3 Sheets-Sheet 2
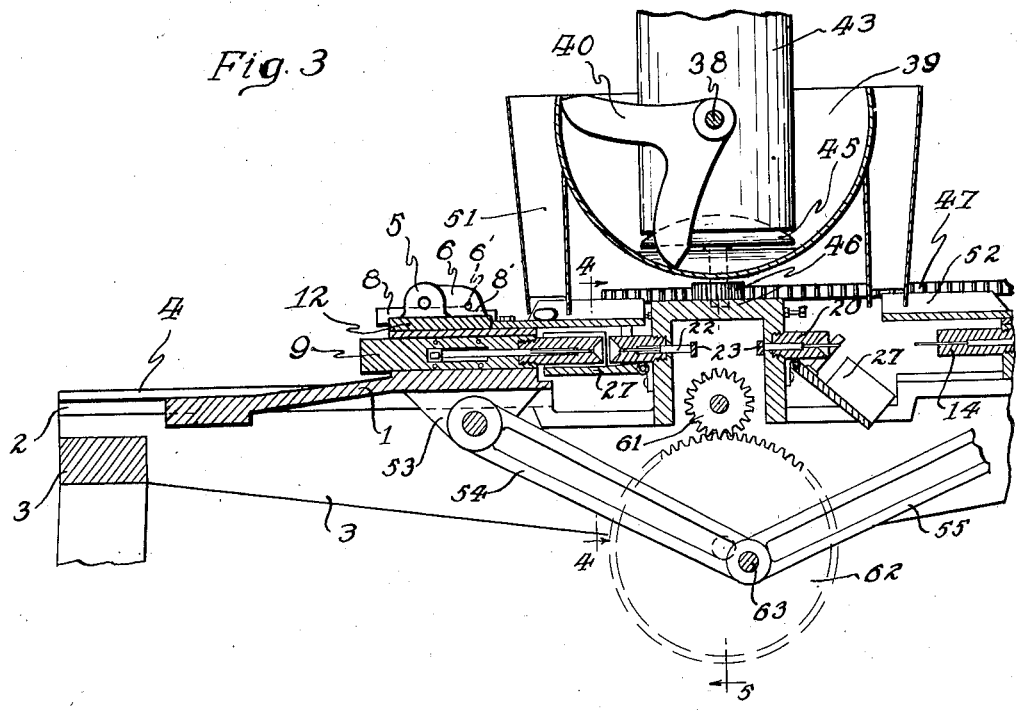
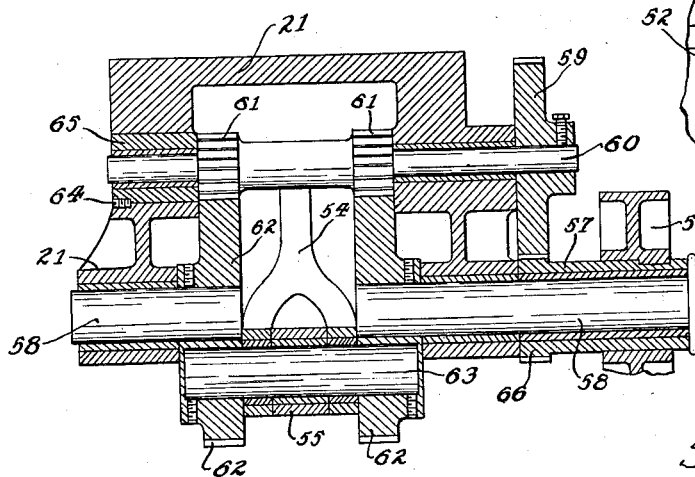
Inventor
Sam Marghitan
By Arnold M. Ehrlich
  atty.

Nov. 26, 1935.    S. MARGHITAN    2,022,356
MULTIPLE NUT CRACKING MACHINE
Filed May 14, 1934    3 Sheets-Sheet 3
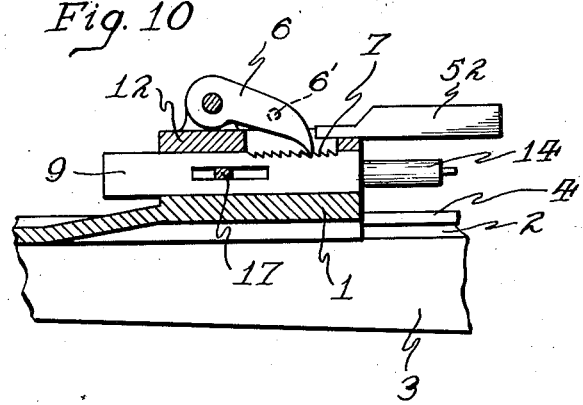
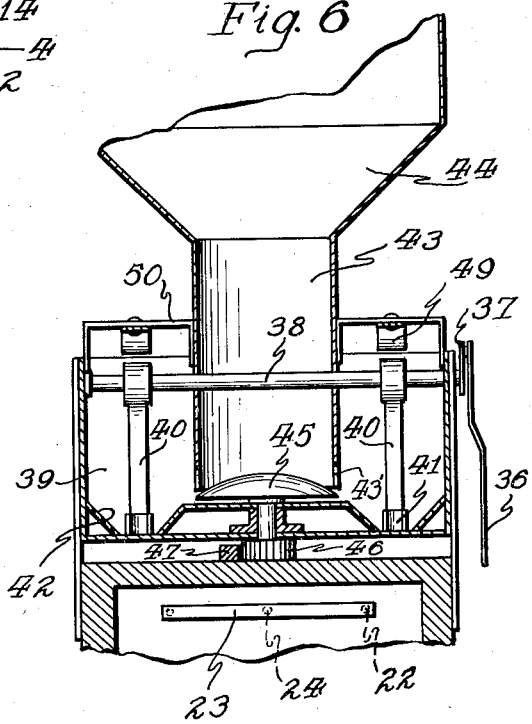
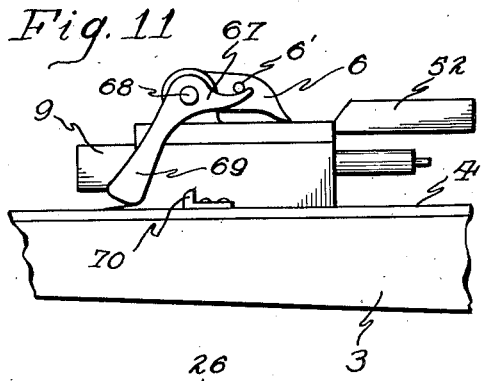
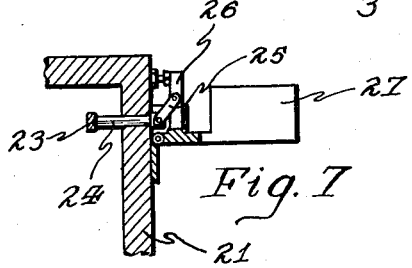
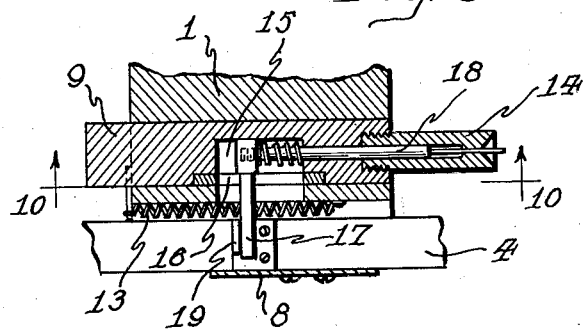
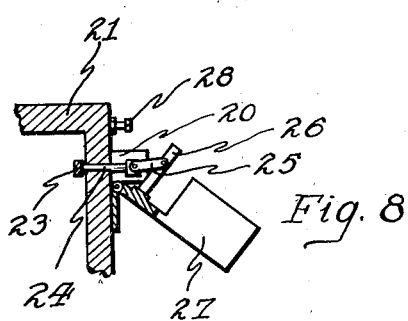
Inventor
Sam Marghitan
atty.

Patented Nov. 26, 1935

2,022,356

UNITED STATES PATENT OFFICE 2,022,356

MULTIPLE NUT CRACKING MACHINE

Sam Marghitan, Chicago, Ill.

Application May 14, 1934, Serial No. 725,555

3 Claims. (Cl. 146—12)

My invention is a multiple nut cracking machine in which two carriages are operated by a reciprocating driving mechanism in conjunction with an oscillatory feeding mechanism.

The main objects of my invention are to provide a multiple nut cracking machine, to provide reciprocal driving means to the die carriages, to provide an oscillatory feeding means, to provide an adjustable trigger mechanism for the cracking die holders, to provide a knockout mechanism for the movable and stationary dies which operate independently of each other, to provide a new hopper to facilitate the feeding mechanism, and numerous minor objects which will be made apparent in a further discussion of my invention in this specification.

My multiple nut cracking machine is entirely new in construction and operation and is advantageous over other nut cracking machines in that the nuts are fed uniformly and placed in position for cracking by a more efficient feeding mechanism. The two cracking dies on each carriage are independently adjustable, thus preventing the crushing of the nut or leaving uncracked nuts. The knockout mechanism of each movable die is likewise independently operating. The carriage is given a rectilinear motion by having side arms on the carriage slidable in a grooved guideway in the sides of the stationary frame. The two carriages are reciprocally operated thereby doubling the number of nuts handled per minute. The cracked nuts are dropped into a retainer below the machine thereby conserving space. The machine as a whole is more compact and higher in operating efficiency than any other machine of this class in use at the present time.

An illustrative embodiment of this invention is shown in the accompanying drawings wherein:

Fig. 3 is a cross section of the machine taken on line 3—3 of Fig. 2.

Fig. 4 is a section taken on line 4—4 of Fig. 3.

Fig. 5 is a cross section of the driving mechanism taken on line 5—5 of Fig. 3.

Fig. 6 is a cross section through the center of the hopper taken on the line 6—6 of Fig. 2.

Fig. 7 is a cross section showing the kick out arrangement of the stationary dies and the hinged feed trough.

Fig. 8 is a same section of Fig. 7 but in emptying position.

Fig. 9 is a plan section of one of the die holders showing the construction of knockout mechanism.

Fig. 10 is a vertical section of the die carriage taken on line 10—10 of Fig. 9, showing the pawl in engagement with the ribbed surface of the cracking die holder.

Fig. 11 is a side elevational view of the die carriage showing a modified form of tripping means for the die holder.

Figure 1:
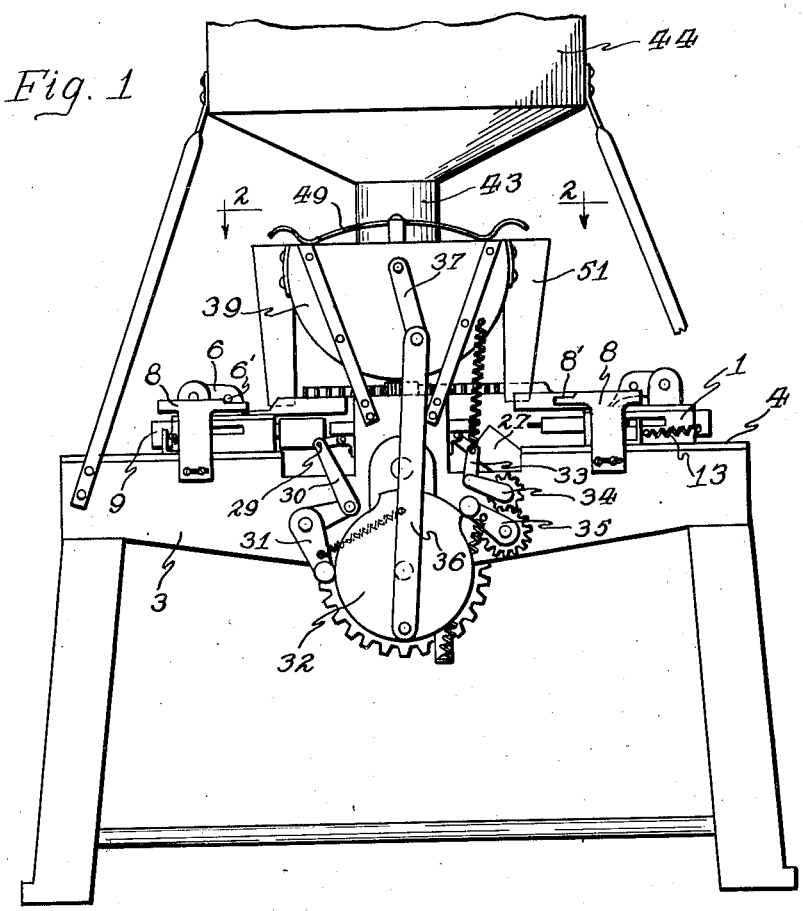
Fig. 1 is a side elevation of the entire machine.
Figure 2:
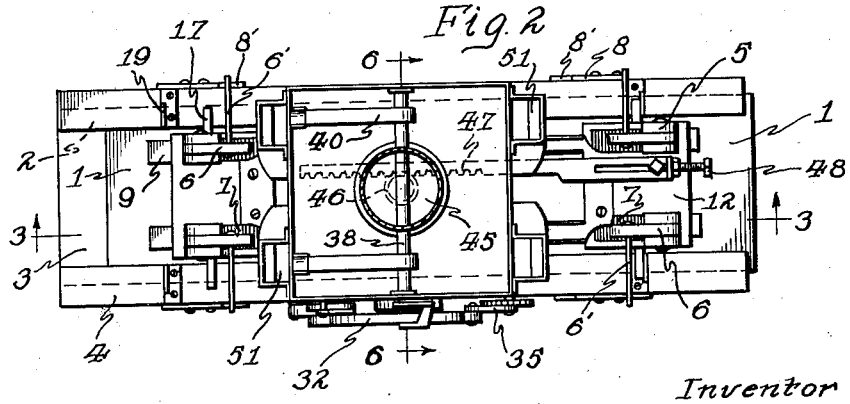
Fig. 2 is a plan view of the machine with the hopper removed.

In the form shown in the accompanying drawings, this machine comprises two movable die carriages 1, which slide in grooves 2 of a stationary frame 3, the upper side of the grooves 2, being formed by a rack plate 4, suitably bolted to the frame 3. A plate 12 secured to the carriage 1 over the die holders 9, is cast with two pair of flanges 5 between which a trigger pawl 6 is pivotally supported directly over a ribbed portion 7 on the die holder 9, the pawl 6 has a side arm or follower 6' which rides on the periphery of a cam 8 adjustably secured to the sides of the frame 3, the cam 8 has a recess 8' in its periphery which permits the pawl to drop into engagement with the ribbed portion 7 of the die holder 9. The die holder 9 is held down in a slot of carriage 1 by the plate 12 and pinned to the side of the die holder 9, Fig. 9, is a spring 13, anchored to the carriage 1, to resiliently bring back the die holder 9 after the cracking of the nut by the die 14, which is screwed into the end of the die holder 9. Centrally located in holder 9 is an aperture 15, with a removable slotted plate 16, affixed in the side of holder 9, slidable in aperture 15, and protruding through the slot in plate 16 is a knockout lever 17, in which is threaded a knockout pin 18, the pin 18 passes centrally through the die holder 9 and the die 14, to eject the nut from the mouth of the die 14 when the lever 17 strikes against the knockout bracket 19, secured to the plate 4 on the frame 3 as the carriage 1 is moved backwards.

Opposite each of the movable cracking dies 14 are stationary dies 20, screwed into the side of housing 21, Figs. 3 and 4, each of these dies 20 has a knockout pin 22 screwed into a cross arm 23, which has attached at its center an actuating rod 24, Figs. 7 and 8, and connected by pinned connecting arms 25 to a vertical post 26, screwed into the base of the hinged feed troughs 27, the vertical post 26, abuts against an adjustable stop 28, screwed into the housing 21. One pair of feed troughs are actuated up and down by a rod 29, the end of which is linked by arm 30 to a bell crank lever arm 31, actuated by a cam 32, Fig. 1. The rod 29 controlling the other pair of feed troughs 27 is linked by arm 33 to a lever 34 geared to a second lever 35, which is in contact with the cam 32, suitable springs hold the levers 31 and 35 in engagement with the cam 32.

Pinned to the cam 32, near its periphery is an arm 36, which is pinned to a shorter arm 37, and actuating a shaft 38 in oscillatory hopper 39, Figs. 3 and 6. Keyed to the shaft 38 are two feeding arms 40, with grooved end portions 41, to lift a nut from the bottom of the sloped portion 42 of the hopper 39. A main hopper 44 has a spout 43 extending downward into the oscillatory hopper 39, and beneath the mouth of spout 43 is a semi-spherical agitating disc 45, which is mounted on a shaft having a pinion 46 on its lower end thereof. The said pinion 46 is in engagement with a rack 47 secured to the carriage 1 and movable therewith. An adjusting bolt 48 is provided for regulating the amount of agitation of the disc 45. A pair of openings 43' are cut out of the side of the spout 43 for the passage of nuts into the oscillatory hopper 39.

Extending over the path of the swinging feed arms 40, is a narrow spring guard 49, supported by braces 50, which also acts to support the spout 43, and as the nut is raised by the feeding arms 40, well above pivoting point so as to avoid raising more than one nut at a time, it hits the spring guard 49 and drops down the feeding channel 51, and onto the V shaped feeding rack 52, which is bolted to the plate 12, Fig. 3.

Underneath the carriages 1 are two downwardly extending flanges 53, between which is pinned the connecting rod 54, of one carriage and connecting rod 55, on the other carriage. These two connecting rods are jointly pinned to the reciprocal driving mechanism shown by Figure 5, in which a driving pulley 56 is powered by a suitable motor. The pulley 56 is keyed to a sleeve 57 on a shaft 58. The inner end of the sleeve 57 is geared to a driving gear 59, keyed to a drive shaft 60, supported by the housing 21. The gears 61 on shaft 60 engage two larger gears 62, keyed to the crank shaft 58.

Between these two gears 62 is the crank pin 63, on which is connected the forked end connecting rod 54, and the straight connecting rod 55. The crank pin 63 is offset from the center of the gear 62, thereby giving a reciprocal motion to the carriages 1. The gears 61 and the shaft 60 are of one solid piece and are removed from the housing 21, by removal of the screw 64, and thence the sleeve 65. Suitable bushings are provided for the bearings of shafts 60, 58 and crank pin 63.

The pulley 56 keyed on the sleeve 57 is driven by any suitable power, the geared portion 66 of the sleeve 57, actuates the driving gear 59, keyed to shaft 60, and the gears 61 engaging the gears 62 give a synchronized motion. The offset crank pin 63, to which is connected the connecting rods 54, and 55 impart a reciprocal motion to the two carriages 1, slidable in the grooves 2 of the stationary frame 3.

When a nut is fed by the feeding arm 40, down the feeding channel 51 and onto the V shaped rack 52 the carriage 1 is moved backwards by the connecting rod 54, and the extending ends of the feeding channel 51, Fig. 3, carry the nut past the end of the feeding rack 52, dropping the nut into the feeding trough 27 in position to be cracked. Then as the carriage 1 moves forward, the nut is caught between the die 14 and the die 20, the die holder 9 resiliently moves back against the action of the spring 13, Fig. 10, until the follower 6' drops into the recess 8' of the cam 8 and simultaneously dropping the pawl 6 into engagement with the ribbed portion 7 of the die holder 9, thereby holding the said die holder 9 rigid to crack the nut with the remaining forward motion of the said carriage 1. By adjusting position of the cam 8 on the frame 3, the amount of cracking of the nut can be carefully regulated. The carriage again moves backward and the lever arm 17 strikes against the knock out bracket 19 and moves the knock out pin 18 forward through opening in die 14, ejecting the nut or fragments of nut. Meanwhile the cam 32, engages the bell crank lever 31 and lever arm 30, actuating the rod 29, thereby lowering the hinged feed troughs 27 emptying the cracked nut into retainer below machine, the vertical post 26, linked by the arm 25 to rod 24, Figs. 8 and 9, actuates the rod 24, and the cross arm 23 with knock out pins 22 moves forward ejecting the fragments of nut from the stationary dies 20.

While the dies 14 and 20 were cracking the nut, the feeding arm 40 fed a second nut down the feeding channel 51 and onto the V shaped rack 52; the second nut is moved forward in rack 52, as the carriage moves backwards, shortly before the carriage 1 reaches its farthest point, the cam 32 releases the hinged feed trough 27 in time to catch the second nut from the rack 52 and the carriage again moves forward to crack the second nut and at the same time receive the third nut in the rear of feed rack 52. While this carriage is in its forward or cracking position, the other carriage is in the alternate or back position due to the reciprocating action of the driving mechanism, transmitted by the connecting rods 54 and 55.

The feeding arms 40, oscillating in the hopper 39, are so adjusted as to feed a nut by means of the feed channel 51, to the feed rack 52 at the moment the carriage 1 is in its forward or cracking position. One complete revolution of the cam 32, makes one complete oscillation of the feeding arms 40, in the same time each carriage 1 makes a forward and backward motion, or a backward and forward motion.

The trigger operating means of a modified form is shown in Fig. 11 and comprises an eccentric lifting arm 67 pivotally secured to the projecting shaft 68, the weight of the leg 69 of the arm 67 normally raises the side arm or follower 6' of the trigger pawl 6; as the carriage 1 moves forward the leg 69 engages the bracket 70 adjustably secured to the plate 4 on the frame 3, and as the leg 69 is knocked up the follower 6' is lowered and the trigger pawl 6 drops into engagement with the ribbed portion 7 of the die holder 9.

Although but one specific embodiment of this invention has been herein shown and described, it will be understood that numerous details may be modified or omitted without departing from the spirit of this invention.

What I claim is:

1. In a nut-cracking machine including a pair of movable dies and a pair of stationary dies, knock-out rods slidably mounted in said dies, means for intermittently moving the knock-out rods in said movable dies, means for intermittently moving the knock-out rods in said stationary dies comprising a hinged feed trough, rods mounted in said feed troughs, levers having one end connected to said rods, a bell crank having one arm connected to the other end of one of said levers, a second lever having one end connected to the other end of the other of said first named levers, a pinion connected to the other end of said second named lever, a second pinion adapted to mesh with said first named pinion, a cam, means for rotating said cam, said last named arm adapted to engage said cam at one side thereof, the other arm of said bell crank being adapted to engage the other side of said cam, springs adapted to hold said arms in engagement with said cam, an upright carried by said feed trough, and a link having one end connected to said upright and the other end connected to the knock-out rods in said stationary dies.

2. In a nut-cracking machine including a pair of aligned movable dies and stationary dies, knock-out rods slidably mounted in said dies, means for intermittently moving the knock-out rods in said movable dies, means for intermittently moving the knock-out rods in said stationary dies comprising a hinged feed trough adapted to straddle each of said pair of movable and stationary dies when said movable dies are in closed position, rods mounted in said feed troughs, levers having one end connected to said rods, a bell crank having one arm connected to the other end of one of said levers, a second lever having one end connected to the other end of the other of said first named levers, a pinion connected to the other end of said second named lever, a second pinion adapted to mesh with said first named pinion, a cam, means for rotating said cam, said last named arm adapted to engage said cam at one side thereof, the other arm of said bell crank being adapted to engage the other side of said cam, springs adapted to hold said arms in engagement with said cam, an upright carried by said feed trough, and a link having one end connected to said upright and the other end connected to the knock-out rods in said stationary dies, said feed trough being adapted to be lowered when said movable dies are in open position.

3. A nut-cracking machine including a frame member, a pair of aligned stationary dies mounted in opposite directions in said frame, a pair of movable dies mounted on said frame and adapted to abut said stationary dies when in closed position, means for moving said movable dies, knock-out rods movably mounted in said movable and stationary dies, means for intermittently moving the knock-out rods in said movable dies, and means for intermittently moving the knock-out rods in said stationary dies comprising a hinged feed trough adapted to straddle each of said pair of movable and stationary dies when said movable dies are in closed position, rods mounted in said feed troughs, levers having one end connected to said rods, a bell crank having one arm connected to the other end of one of said levers, a second lever having one end connected to the other end of the other of said first named levers, a pinion connected to the other end of said second named lever, a second pinion adapted to mesh with said first named pinion, a cam, means for rotating said cam, said last named arm adapted to engage said cam at one side thereof, the other arm of said bell crank being adapted to engage the other side of said cam, springs adapted to hold said arms in engagement with said cam, an upright carried by said feed trough, and a link having one end connected to said upright and the other end connected to the knock-out rods in said stationary dies, said feed trough being adapted to be lowered when said movable dies are in open position.

SAM MARGHITAN.